No. 649,667. Patented May 15, 1900.
W. B. MASON.
MOTOR CARRIAGE.
(Application filed Nov. 11, 1899.)
(No Model.)
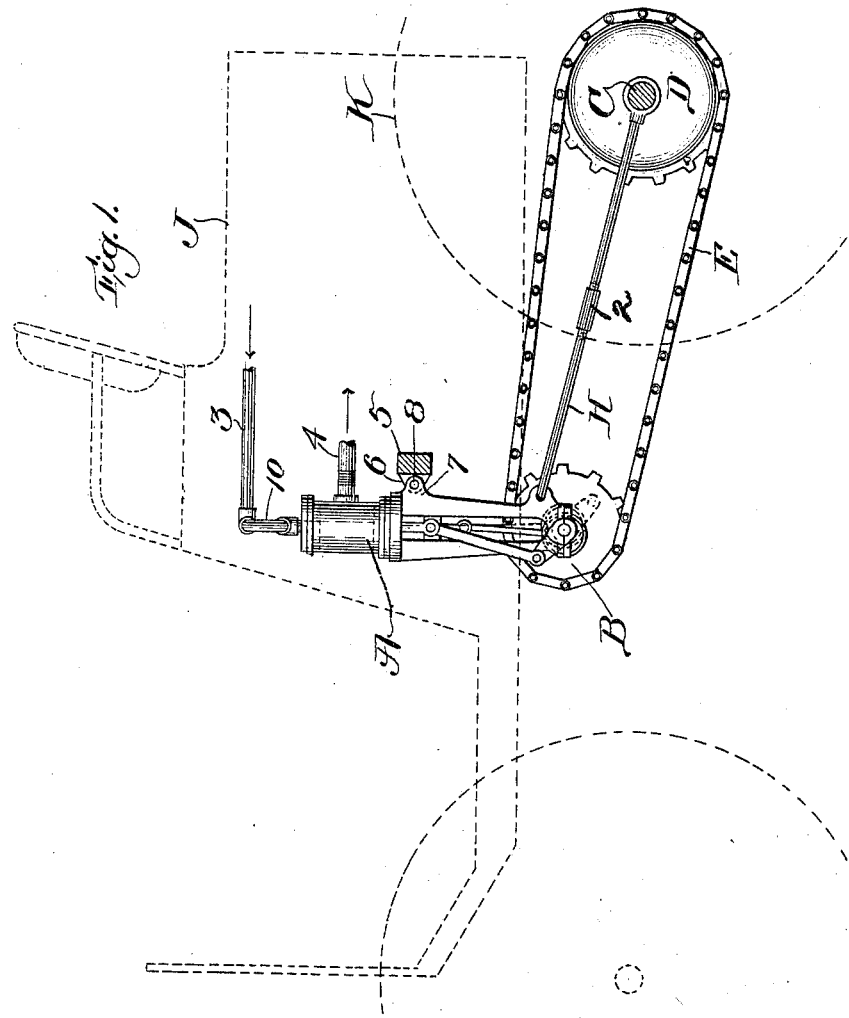
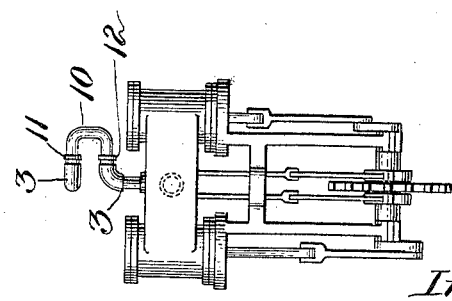
Witnesses:
Arthur F. Randall
Alice H. Morrison
Inventor:
Wm. B. Mason
by Macleod Calver & Randall
Attorneys

UNITED STATES PATENT OFFICE.

WILLIAM B. MASON, OF BOSTON, MASSACHUSETTS.

MOTOR-CARRIAGE.

SPECIFICATION forming part of Letters Patent No. 649,667, dated May 15, 1900.

Application filed November 11, 1899. Serial No. 736,604. (No model.)

*To all whom it may concern:*

Be it known that I, WILLIAM B. MASON, a citizen of the United States, residing at Boston, in the county of Suffolk, State of Massachusetts, have invented a certain new and useful Improvement in Motor-Carriages, of which the following is a specification, reference being had therein to the accompanying drawings.

In one class of motor-carriages as now constructed the engine which furnishes the motive power is bolted or otherwise rigidly secured to a cross-piece which is rigidly connected with and forms a part of the carriage-body. Power is conveyed to the rear axle of the vehicle by means of a chain-and-sprocket mechanism, there being one sprocket on the said axle and another on the shaft of the engine and a chain passing around both sprockets. To regulate the slack of the chain, a space-rod having a turnbuckle therein or equivalent device is employed. To take up slack in the chain, this rod is lengthened, and as the rear end of the rod is fixed the lengthening of it moves the engine and its sprocket farther away from the sprocket on the axle, and this causes the frame-piece, to which the engine is rigidly secured, to spring or be twisted, which is undesirable. The same effect is obtained by vertical movement of the carriage-body on its springs, which may result from the load of the carriage being increased or diminished or by the movement of the carriage over rough ground or the like.

My invention has for its objects to avoid the difficulties above pointed out by preventing any undue strain of the parts of the carriage-body which support the engine, and, further, to so mount the engine that it may be readily detached from its support and replaced thereon when desired.

My invention is fully set forth in the following description, in which reference is made to the accompanying drawings, and the novel features are pointed out and clearly defined in the claims at the close of this specification.

Having reference to the drawings, Figure 1 is a side elevation, partly in section, showing an engine and the chain-and-sprocket driving mechanism connecting it with the rear axle, the outlines of the carriage body and wheels being indicated by dotted lines. Fig. 2 is a front elevation of the engine detached, showing the steam-supply-pipe connection.

In the drawings, A designates the engine; B, the sprocket on the engine-shaft; C, the rear axle of the carriage; D, the sprocket thereon; E, the driving-chain; H, the space-rod, having a turnbuckle 2 therein. The steam-inlet pipe is shown at 3 and the exhaust-pipe at 4.

J is the carriage-body, which is shown in outline by dotted lines, and K indicates a portion of the periphery of one of the rear wheels. A cross-piece 5 extends from side to side of the carriage-body and is rigidly secured thereto. To the said cross-piece two lugs or projections 6 are secured, one of which is shown, Fig. 1. Corresponding lugs 7 are provided on the frame of the engine, preferably adjacent the cylinders, as shown. One of these lugs is provided at each side of the engine-frame. The lugs 6 are preferably so spaced on the cross-piece 5 that one of said lugs 6 will project close to one of the lugs 7. A hole is provided in each of the lugs 6 and 7, and a bolt 8 is passed through the holes in the lugs 6 and 7 and is provided with suitable means to prevent its displacement. The said bolt 8 serves to pivot the engine on the cross-piece 5, and the engine is permitted to swing slightly on the pivot in case the lower end of the engine-frame, which carries the shaft on which the sprocket B is mounted, is moved from or toward the rear axle C either by means of the turnbuckle on the space-rod H, which is used to adjust the slack of the chain, or in case the body of the vehicle is caused to move vertically, carrying the engine with it.

As the steam-inlet pipe is preferably rigidly connected with the boiler, it should have a flexible connection in it to accommodate the movement of the engine-frame on the pivot 8. To this end I insert in the inlet-pipe 3 a U-shaped connection 10, each end of which is united to the sections of said supply-pipe 3 by means of couplings 11 and 12, which are so formed as to permit movement of the U-shaped connection 10 relatively to each section of the supply-pipe 3. By this arrangement the engine may be readily removed from or replaced in the carriage-body, it being necessary only to disconnect the supply-pipe 3, the space-rod H, remove the chain, and withdraw the bolt 8, which secures the engine to the cross-piece 5.

What I claim is—

1. In a motor-carriage, a suitable support for the engine, an engine pivotally mounted on said support, mechanism for conveying power from the engine to the axle, and flexible inlet connections through which the steam or other motive force employed is supplied to the engine, substantially as described.

2. In a motor-carriage the combination with one of the axles thereof, of an engine, a suitable support therefor to which said engine is pivotally connected, chain-and-sprocket mechanism for conveying power from said engine to said axle, and a flexible connection in the steam-supply pipe of the engine, substantially as and for the purposes set forth.

3. The combination, with the driving-axle of an automobile vehicle, of a pivotally-supported propelling-engine for said vehicle, a brace between the crank-shaft of said engine and said axle, a sprocket on the latter and one on said crank-shaft, a driving-chain engaging said sprockets, and means for lengthening and shortening said brace whereby the engine may be swung on its support for tightening or loosening the said chain.

In testimony whereof I affix my signature in presence of two witnesses.

WILLIAM B. MASON.

Witnesses:
WM. A. MACLEOD,
ALICE H. MORRISON.